US008478763B2

(12) United States Patent
Anderson et al.

(10) Patent No.: US 8,478,763 B2
(45) Date of Patent: *Jul. 2, 2013

(54) UNIFIED SEARCHING AND RUNNING OF FILES

(75) Inventors: Bret P. Anderson, Puyallup, WA (US);
David A. Matthews, Seattle, WA (US);
Matthew A. Lerner, Seattle, WA (US);
Song Zou, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/621,085

(22) Filed: Nov. 18, 2009

(65) Prior Publication Data
US 2010/0063967 A1  Mar. 11, 2010

Related U.S. Application Data

(63) Continuation of application No. 11/392,968, filed on Mar. 30, 2006, now Pat. No. 7,630,975.

(51) Int. Cl.
*G06F 7/00* (2006.01)
(52) U.S. Cl.
USPC ........... 707/748; 707/716; 707/741; 707/754; 707/759
(58) Field of Classification Search
USPC ................... 707/999.002, 999.004, 999.005, 707/999.006
See application file for complete search history.

(56) References Cited

U.S. PATENT DOCUMENTS

| 5,848,410 | A | * | 12/1998 | Walls et al. ........................ 1/1 |
| 6,321,226 | B1 | * | 11/2001 | Garber et al. ...................... 1/1 |
| 2001/0056444 | A1 | * | 12/2001 | Ide et al. ...................... 707/513 |
| 2004/0215600 | A1 | * | 10/2004 | Aridor et al. ...................... 707/3 |
| 2004/0220898 | A1 | * | 11/2004 | Eguchi et al. .................... 707/1 |
| 2006/0259516 | A1 | * | 11/2006 | Stakutis et al. ............... 707/200 |
| 2007/0043714 | A1 | * | 2/2007 | Stanton et al. ................... 707/4 |
| 2007/0043750 | A1 | * | 2/2007 | Dingle ........................... 707/101 |

FOREIGN PATENT DOCUMENTS
RU  2003106832 A  1/2005

* cited by examiner

*Primary Examiner* — Pierre M. Vital
*Assistant Examiner* — Mohammad S Rostami
(74) *Attorney, Agent, or Firm* — Shook, Hardy & Bacon L.L.P.

(57) ABSTRACT

A unified user interface is described that allows a user to search, browse, and launch items from the same user interface. For example, a single text input box may be provided that allows the user to perform all these functions by typing in a portion of an item name or an entire item name. The various functions may be selectively performed depending upon the text inputted by the user into the text input box. For example, where the text appears to be the beginning of an item name, then those items matching the input text will dynamically appear as the user types. Or, where the text appears to be the beginning of a file path, then items in that file path may be presented. In addition, advanced items such as system files may be suppressed so that inexperienced users do not accidentally stumble across these items.

14 Claims, 5 Drawing Sheets

UNIFIED SEARCHING AND RUNNING OF FILES

CROSS-REFERENCE TO RELATED APPLICATIONS

This application is a continuation of and claims benefit of priority to U.S. patent application Ser. No. 11/392,968, filed on Mar. 30, 2006 now U.S. Pat. No. 7,630,975.

BACKGROUND OF THE INVENTION

Recently, emphasis has been placed on improving search functionality in computer systems. The ability to conveniently search, browse, or otherwise locate files, folders, websites, and other items, is of greater importance as data storage becomes cheaper and interconnectivity becomes more widespread.

Search and browse functionality exists in many forms. One can use a portal web page that provides an online search engine via the Internet, such as http://www.msn.com or http://www.yahoo.com. Once may also use searching and browsing functionality built locally into the user's computer. For instance, the Microsoft WINDOWS line of operating systems, such as the WINDOWS XP operating system, provides a Search dialog accessible from the Start menu that may be used to search and browse for files and folders. Another example is the MSN search deskband that can be downloaded and executed on a user's computer. The deskband allows users to type paths and open folders, but does not allow users to browse through folders. Nor does the deskband prohibit non-advanced users from unintentionally launching advanced files such as operating system files that otherwise could damage the computer if accidentally modified.

The user is also provided with the ability to execute or otherwise launch items that the user already knows exists. For example, the WINDOWS XP operating system provides a separate Run dialog, also accessible from the Start menu, that allows the user to launch files, folders, and websites by typing in the names of those items in a text input box.

There is presently no known tool, especially one built into a user's local computer, that provides the user with the ability to search, browse, and directly launch items all from the same tool using the same interface.

BRIEF SUMMARY OF THE INVENTION

Accordingly, some features described herein are directed to providing a unified user interface that allows a user to search, browse, and launch items from the same user interface. For example, a single text input box may be provided that allows the user to perform all these functions by typing in a portion of an item name or an entire item name.

Further features described herein are directed to intelligently performing different functions depending upon the text inputted by the user into the text input box. For example, where the text appears in the beginning of any word in an item name, then those items matching the input text will dynamically appear as the user types. The user may then select from those displayed search results or narrow them by continuing to type additional text. Or, where the text appears to be the beginning of a file path, then items in that file path, and optionally even items deeper down in the hierarchy of that file path, may be dynamically displayed as selectable search results while the user types.

Still further features described herein are directed to suppressing, or hiding, those items that are considered advanced items or other items that are desired for such suppression. An advanced item is any item that, for whatever reason, is considered by the system to be an item that a non-advanced user does not normally need to directly access. For instance, an advanced item may be a system file that could be irreparably damaged if modified by an inexperienced user. In the Microsoft WINDOWS line of operating systems, advanced items may be those executable programs that are not shown on the Start menu. In general, those items that would otherwise be suppressed in the search results may appear in the search results responsive to the user correctly identifying that item by typing in the item's full file name. This may allow more advanced users to access known advanced items while making it difficult for inexperienced users to accidentally damage their operating system or become confused by the appearance of advanced items in the search results.

These and other aspects of the disclosure will be apparent upon consideration of the following detailed description of illustrative embodiments.

BRIEF DESCRIPTION OF THE SEVERAL VIEWS OF THE DRAWING

The foregoing summary, as well as the following detailed description of illustrative embodiments, is better understood when read in conjunction with the accompanying drawings, which are included by way of example, and not by way of limitation with regard to the claimed invention.

DETAILED DESCRIPTION OF THE INVENTION

Illustrative Computing Environment

Figure 1:
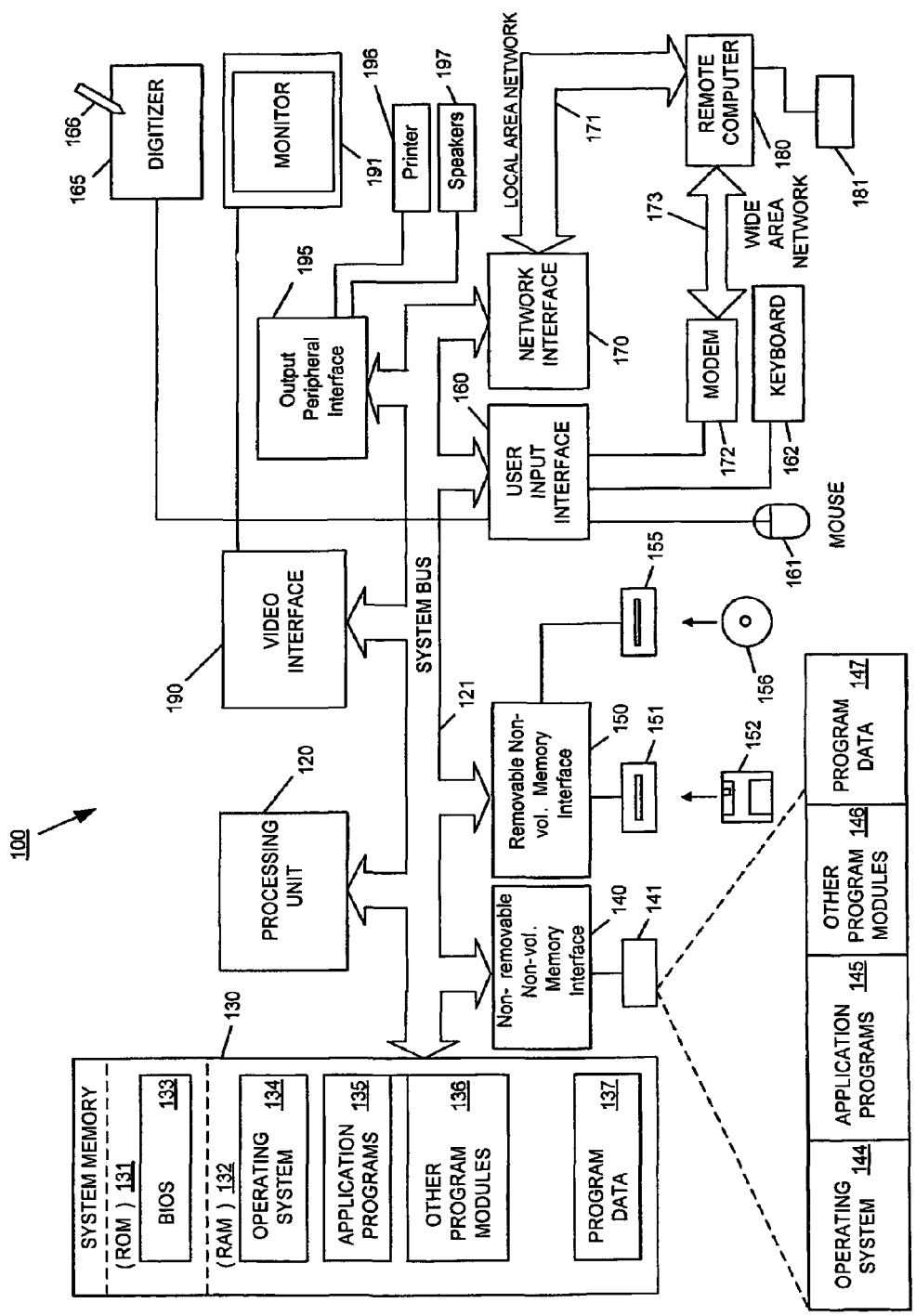
FIG. 1 is a functional block diagram of an illustrative computing environment.

FIG. 1 illustrates an example of a suitable computing system environment 100 in which aspects as described herein may be implemented. Computing system environment 100 is only one example of a suitable computing environment and is not intended to suggest any limitation as to the scope of use or functionality of various aspects as described herein. Neither should computing system environment 100 be interpreted as having any dependency or requirement relating to any one or combination of components illustrated in illustrative computing system environment 100.

One or more other general purpose or special purpose computing system environments or configurations may be used. Examples of well known computing systems, environments, and/or configurations that may be suitable include, but are not limited to, personal computers (PCs); server computers; hand-held and other portable devices such as personal digital assistants (PDAs), tablet PCs or laptop PCs; multiprocessor systems; microprocessor-based systems; set top boxes; programmable consumer electronics; network PCs; minicomputers; mainframe computers; distributed computing environments that include any of the above systems or devices; and the like.

Aspects of the disclosure herein may be described in the general context of computer-executable instructions, such as program modules, stored on one or more computer-readable media and executable by a computer. Generally, program modules include routines, programs, objects, components, data structures, etc. that perform particular tasks or implement particular abstract data types. Embodiments discussed herein may also be operational with distributed computing environments where tasks are performed by remote processing devices that are linked through a communications network. In a distributed computing environment, program modules may be located in both local and remote computer-readable media including memory storage devices.

With reference to FIG. 1, illustrative computing system environment 100 includes a general purpose computing device in the form of a computer 100. Components of computer 100 may include, but are not limited to, a processing unit 120, a system memory 130, and a system bus 121 that couples various system components including system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Advanced Graphics Port (AGP) bus, and Peripheral Component Interconnect (PCI) bus, also known as Mezzanine bus.

Computer 100 typically includes a variety of computer-readable media. Computer readable media can be any available media that can be accessed by computer 100 such as volatile, nonvolatile, removable, and non-removable media. By way of example, and not limitation, computer-readable media may include computer-readable media and communication media. Computer-readable media are tangible media, and may include volatile, nonvolatile, removable, and non-removable media implemented in any method or technology for storage of information such as computer-readable instructions, data structures, program modules or other data. For example, computer-readable media includes random-access memory (RAM), read-only memory (ROM), electrically-erasable programmable ROM (EEPROM), flash memory or other memory technology, compact-disc ROM (CD-ROM), digital video disc (DVD) or other optical disk storage, magnetic cassettes, magnetic tape, magnetic disk storage or other magnetic storage devices, or any other medium which can be used to store the desired information and which can accessed by computer 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF) (e.g., BLUETOOTH, WiFi, UWB), optical (e.g., infrared) and other wireless media. Any single computer-readable medium, as well as any combination of multiple computer-readable media, are both intended to be included within the scope of the term "computer-readable medium" as described and claimed herein.

System memory 130 includes computer-readable storage media in the form of volatile and/or nonvolatile memory such as ROM 131 and RAM 132. A basic input/output system (BIOS) 133, containing the basic routines that help to transfer information between elements within computer 100, such as during start-up, is typically stored in ROM 131. RAM 132 typically contains data and/or program modules that are immediately accessible to and/or presently being operated on by processing unit 120. By way of example, and not limitation, FIG. 1 illustrates software in the form of computer-executable instructions, including operating system 134, application programs 135, other program modules 136, and program data 137.

Computer 100 may also include other computer storage media. By way of example only, FIG. 1 illustrates a hard disk drive 141 that reads from or writes to non-removable, non-volatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM, DVD, or other optical media. Other computer storage media that can be used in the illustrative operating environment include, but are not limited to, magnetic tape cassettes, flash memory cards, digital video tape, solid state RAM, solid state ROM, and the like. Hard disk drive 141 is typically connected to system bus 121 through a non-removable memory interface such as an interface 140, and magnetic disk drive 151 and optical disk drive 155 are typically connected to system bus 121 by a removable memory interface, such as an interface 150.

The drives and their associated computer storage media discussed above and illustrated in FIG. 1 provide storage of computer-readable instructions, data structures, program modules and other data for computer 100. In FIG. 1, for example, hard disk drive 141 is illustrated as storing an operating system 144, application programs 145, other program modules 146, and program data 147. Note that these components can either be the same as or different from operating system 134, application programs 135, other program modules 136, and program data 137, respectively. Operating system 144, application programs 145, other program modules 146, and program data 147 are assigned different reference numbers in FIG. 1 to illustrate that they may be different copies. A user may enter commands and information into computer 100 through input devices such as a keyboard 162 and a pointing device 161, commonly referred to as a mouse, trackball or touch pad. Such pointing devices may provide pressure information, providing not only a location of input, but also the pressure exerted while clicking or touching the device. Other input devices (not shown) may include a microphone, joystick, game pad, satellite dish, scanner, or the like. These and other input devices are often coupled to processing unit 120 through a user input interface 160 that is coupled to system bus 121, but may be connected by other interface and bus structures, such as a parallel port, game port, universal serial bus (USB), or IEEE 1394 serial bus (FIREWIRE). A monitor 191 or other type of display device is also coupled to system bus 121 via an interface, such as a video interface 190. Video interface 190 may have advanced 2D or 3D graphics capabilities in addition to its own specialized processor and memory.

Computer 100 may also include a touch-sensitive device 165, such as a digitizer, to allow a user to provide input using a stylus 166. Touch-sensitive device 165 may either be integrated into monitor 191 or another display device, or be part of a separate device, such as a digitizer pad. Computer 100 may also include other peripheral output devices such as speakers 197 and a printer 196, which may be connected through an output peripheral interface 195.

Computer 100 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 100, although only a memory storage device 181 has been illustrated in FIG. 1. The logical connections depicted in FIG. 1 include a local area network (LAN) 171 and a wide area network (WAN) 173, but may also or alternatively include other networks, such as the Internet. Such networking environments are commonplace in homes, offices, enterprise-wide computer networks, intranets and the Internet.

When used in a LAN networking environment, computer 100 is coupled to LAN 171 through a network interface or adapter 170. When used in a WAN networking environment, computer 100 may include a modem 172 or another device for establishing communications over WAN 173, such as the Internet. Modem 172, which may be internal or external, may be connected to system bus 121 via user input interface 160 or another appropriate mechanism. In a networked environment, program modules depicted relative to computer 100, or portions thereof, may be stored remotely such as in remote storage device 181. By way of example, and not limitation, FIG. 1 illustrates remote application programs 182 as residing on memory device 181. It will be appreciated that the network connections shown are illustrative, and other means of establishing a communications link between the computers may be used.

As discussed previously, touch-sensitive device 165 may be a device separate from or part of and integrated with computer 100. In addition, any or all of the features, subsystems, and functions discussed in connection with FIG. 1 may be included in, coupled to, or embodied integrally as part of, a tablet computer. For example, computer 100 may be configured as a tablet computer or a handheld device such as a PDA where touch-sensitive device 165 would be considered the main user interface. In such a configuration touch-sensitive device 165 may be considered to include computer 100. Tablet computers are well-known. Tablet computers interpret gestures input to touch-sensitive device 165 using stylus 166 in order to manipulate data, enter text, create drawings, and/or execute conventional computer application tasks such as spreadsheets, word processing programs, and the like. Input may not only be made by stylus 166, but also by other types of styli such as a human finger.

Illustrative Electronic File System Environment

An electronic file system may be implemented by computer 100 to manage files and other objects stored in the various electronic media to which computer 100 has access. The electronic file system may be part of the other program modules 136 and/or part of operating system 134, or it may be a separate software entity. The file system may be a traditional file system that stores files in a hierarchical tree structure. In such a case, each node of the tree is considered a folder that contains one or more files. The location of a file is limited by, and conflated with, its organization within the file system. This means that file locations and directory structure are dependent on one another; when a file is moved to another location, the directory structure also changes to accommodate the new location of the file.

Alternatively, the electronic file system may be more advanced, such as a database-driven file system. In more advanced file systems, shortcut references may be used, allowing files and other objects to appear in one or more locations while actually being in only one of the locations or even in another, completely different location.

Integration of Item Searching, Launching, and Browsing

As previously mentioned, it may be desirable to integrate searching, browsing, and launching into a single user interface having a single place for entering textual user input. For example, referring to the illustrative screenshot of FIG. 3, which may be displayed on a display such as monitor 191, a text input box 301 is provided into which the user may type textual input. Also displayed may be a user-selectable find button 302, a status area 303, and a search results area 304.

As will be discussed in more detail and with regard to specific examples, the user may search for files or other items such as folders or websites, launch items such as by opening non-executable files, opening folders, executing executable files, and opening websites, and browse through file paths, all by typing text into the same text input box 301. Thus, two modes may be defined: a searching mode and a file path browsing mode. These modes may be selected automatically based on what the user types into text input box 301. And, from either of the two modes, any item represented in the search results area 304 may be launched simply by selecting the representation (e.g., graphical icon and/or text description) displayed for that item.

Figure 3:
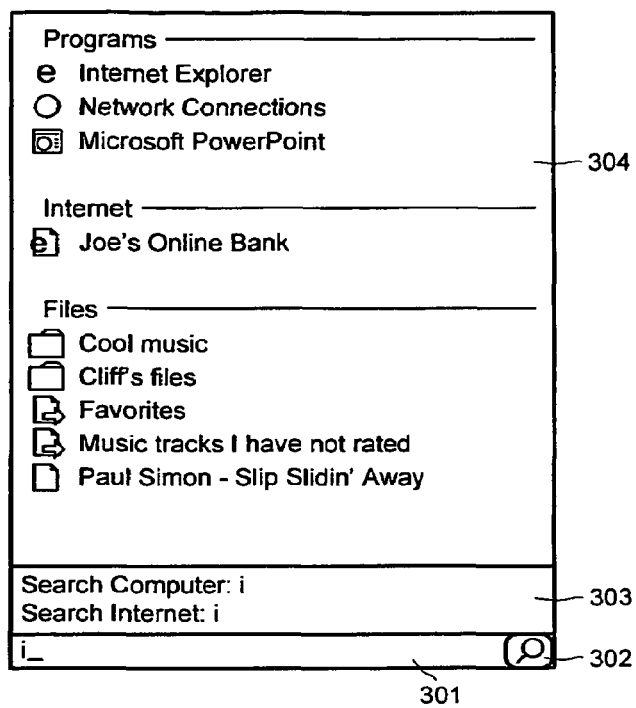
FIGS. 3-8 are successive illustrative screenshots showing how an integrated functionality interface may respond to user input.

The user interface such as shown in FIG. 3 may be implemented in computer 100 as part of operating system 134, as part of the electronic file system, and/or as a separate software application. For example, the user interface of FIG. 3 may be accessible through the Start menu of a Microsoft WINDOWS operating system. For instance, it may be used in addition to, or as a replacement for, the Search and Run dialogs that currently exist.

When in searching mode, searching may be performed for any type of item desired, such as files, folders or other containers, web pages, contacts, emails, etc. While in searching or browsing modes, searching and browsing may be performed anywhere as desired, such as in local storage such as hard disk drive 141, remotely stored items such as memory storage device 181, the Internet, the user's Internet browsing history, the user's favorite or recently-accessed file list.

Item Searching and Launching

Figure 2:
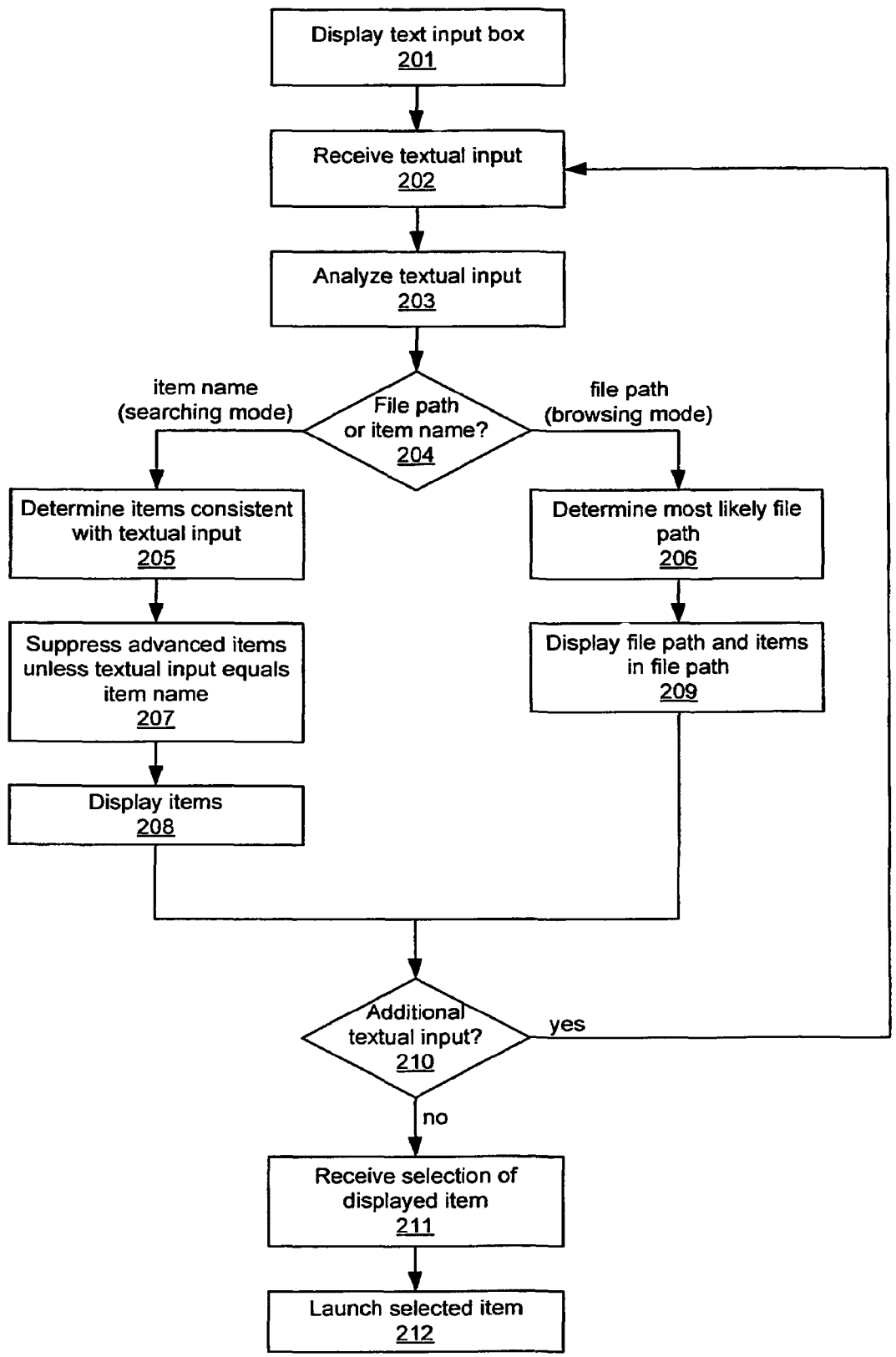
FIG. 2 is a flowchart showing illustrative steps that may be taken in providing integrated search, browse, and launch functionality, including selective advanced item suppression.

FIG. 2 shows a flowchart shows illustrative steps that may be performed by computer 100 to implement the above-described integrated search/browse/launch features. In this section will be described the search and launch functionalities in particular. In operation, text input box 301 is displayed (step 201), and the user may enter textual input into text input box 301 (step 202). For example, as shown in FIG. 3, the user has entered a text string consisting of the letter "i" into text input box 301. In response, computer 100 analyzes the textual input (step 203) to determine whether the textual input represents at least a portion of an item name (e.g., a file name) or other item descriptor, or at least a portion of a file path (step 204).

In the shown example, the textual input is only a single letter. This is because the steps shown in FIG. 2 may be performed each time a letter, numeral, or other character is added or removed from the textual input in text input box 301. Thus, in response to receiving the first letter "i", steps 201-212 as appropriate are performed, and in response to receiving the next letter, such the letter "p" as in FIG. 4, steps 201-212 are again performed as appropriate and the search results updated. Thus, in this example, the search results displayed in search results area 304 are dynamically updated as the user types in text input box 301. For instance, referring to FIG. 4, the search results are narrowed in response to the user's addition of the letter "p" to the textual input, such that the textual input is now "ip". Alternatively, the search results may only be displayed or updated in response to the user selecting find button 302.

Referring again to FIG. 3, status area 303 may display the location(s) to be searched and the search criterion or criteria. In this case, computer 100 is searching for items consistent with textual input "i" stored in the entire computer 100 and on the Internet browser history and favorites. For instance, the search may include all of the user's bookmarked Internet links (i.e., Favorite links) in the user's Internet browser that meet the search criterion "i". In addition or alternatively, computer 100 may search the Internet for web pages or other items meeting the search criterion "i".

As mentioned above, computer 100 may intelligently determine whether textual input entered into text input box 301 represents at least a portion of an item name or at least a portion of a file path. This determination may also be performed dynamically on a character-by-character basis, or only upon user selection of find button 302. To make this determination, computer 100 may follow one or more interpretation rules. For example, where the textual input includes a particular character or character combination, such special indicator characters/combinations may indicate that the textual input represents at least a portion of a file path. Such a character or character combination may be, for example, characters commonly used to designate file paths, such as those used in MSDOS such as "\" or "\\", or a valid drive letter followed by a colon (":") and/or ":\". It may be desirable that these special indicator characters or character combinations be characters or character combinations that would be improper in a file name or other item name.

In the present example, since no special indicator characters are present in the textual input "i", computer 100 determines in step 204 that the textual input represents at least a portion of an item name as opposed to a file path. Thus, a searching mode is entered, and step 205 is performed. In step 205, those items having a name (or other property such as author; the actual content, or body, of the item; file type; etc.) consistent with the textual input are searched for and determined. An item name or other property may be determined to be consistent with the textual input in a variety of ways. For instance, computer 100 may determine all items in which the name or other property begins with the textual input. Or, computer 100 may determine all items in which the name or other property includes the textual input (not necessarily only at the beginning). The latter is the case as shown in FIG. 3, in which each of the search results in search results area 304 include the textual input (i.e., the letter "i") somewhere in their names. Other possibilities are that the user may enter a range as the textual input, such as "1->5", such that all items having the numerals within that defined range, i.e., 1, 2, 3, 4, or 5, are presented in search results area 304. In this case, those items have names that may be considered to be consistent with the range-type textual input.

It can be seen in FIG. 3 that search results area 304 is divided into a plurality of search result types. In this example, the search results are visually grouped or otherwise divided into programs (i.e., executable files), Internet sites, and non-executable files. However, the search results may be grouped or otherwise divided in any manner desired, or not at all.

It can also be seen in FIG. 3 that the search results in search results area 304 are each presented as icons and textual descriptors, in this case item names. The icons may provide information about the type of item being presented. For instance, "Cliff's files" has a folder icon, indicating that this item is a folder, and "Joe's Online Bank" has an icon related to the Microsoft INTERNET EXPLORER web browser, indicating that this item is an Internet site and that the default executable program associated with that item (or type of item) is the Microsoft INTERNET EXPLORER web browser.

A potential problem with integrating search and launch features is that users who use the convention Run dialog referred to previously are typically advanced users and may desire to launch items that may be confusing for less advanced users. For instance, an advanced user may use the Run dialog to launch msconfig or regedit (both operating system files in Microsoft WINDOWS line of operating systems) to better manage his or her computer. The problem is that if these items appeared in response to a textual input of, for example, "g" (since both contain the letter "g"), this result may be confusing (and even disastrous) to the typical non-advanced user. It is not necessarily desirable for a non-advanced user to accidentally stumble upon an advanced item. Normally, such system files are not exposed to users unless a user specifically knows of its existence and where to look for it.

Thus, the example described in connection with FIG. 2 treats advanced search results differently from non-advanced search results. In particular, computer 100 may in step 207 suppress certain items from being displayed as search results that, while they are consistent with the textual input, do not have a name (or other property) that is identical to the textual input. These certain items may be, for example, advanced items such as system files. Computer 100 may determine that an item is a suppressible item based on a property inherent to the item, such as the type of the item or a metadata entry for the item, and/or based on the stored location of the item. For instance, computer 100 may consider all items in a given folder (such as an operating system specific folder) to be suppressible (e.g., advanced) items.

Items may be suppressed in a variety of ways. For instance, the full population of items that are consistent with the textual input may be determined as in step 205, and then those items that should be suppressed are determined and prevented from being part of the displayed set of search results as in step 207. Or, the suppressible items may not be determined at all in step 205. In the latter case, step 207 may instead be a determination as to whether suppressible items should be added to the set of displayed search results. Also, where an index of items is used to aid in searching, in the latter case the suppressible items may be prevented from being determined in step 205 by not being indexed.

Figure 4:
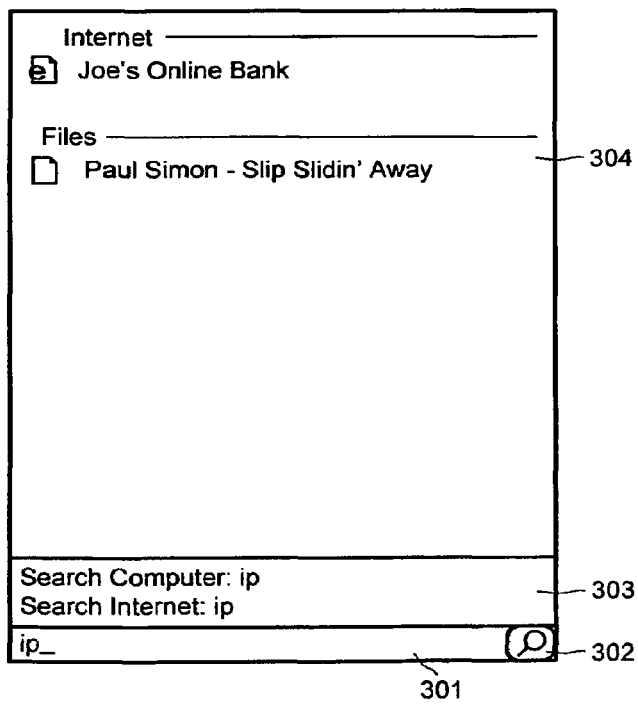
Figure 5:
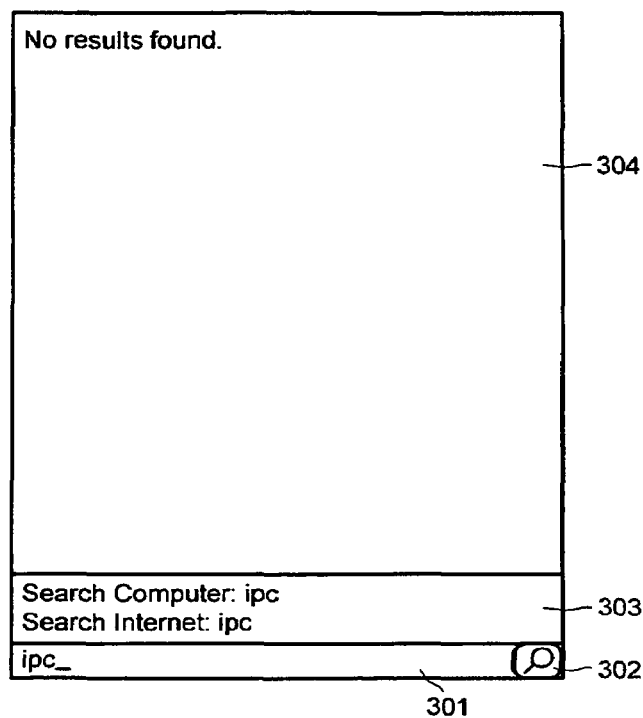
Figure 6:
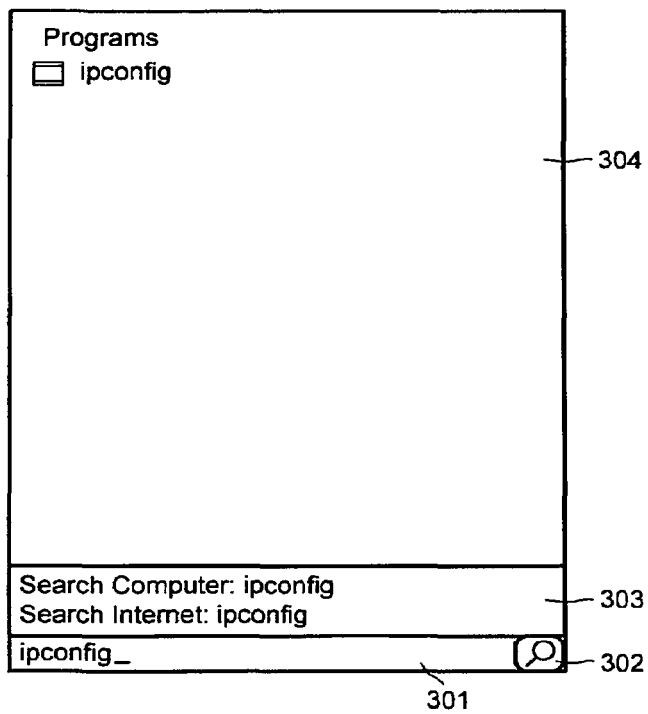

As an example of advanced item suppression, assume that an operating system file exists, named "ipconfig." In FIGS. 3 and 4, even though this file name contains both "i" and "ip", and is therefore in this example consistent with the textual input in both figures, this file does not appear in search results area 304. Further considering FIG. 5, the user has now added the letter "c", such that "ipconfig" is still consistent with the textual input, yet this file still does not appear in search results area 304. It is only after the user has typed the complete file name, "ipconfig", as the textual input (as in FIG. 6) that this file appears in search results area 304. This suppression (or lack of suppression) is, in the embodiment of FIG. 2, decided and implemented in step 207.

In determining whether an item name is identical to the textual input, this depends upon what is meant by an item name. This may depend upon how the system is set up. For example, in many operating systems and electronic file systems, files typically have a main name and an extension. The extension is often separated from the main name such as by a period. For instance, the file ipconfig may actually have an extension ".exe" such that the file name with the extension is "ipconfig.exe". The extension may indicate the file type. In this case, the ".exe" extension indicates that the file is an executable file. In the various examples described herein, the item name may be considered to be only the main name (e.g., "ipconfig") or both the main name and the extension together (e.g., "ipconfig.exe"), as desired.

Returning to FIG. 2, in steps 210 and 202 additional textual input may be received in text input box 301, and so the steps in the flowchart are repeated and the search results are updated as appropriate for each character added (or deleted) from the textual input. If, instead of modifying the textual input, the user selects one of the displayed search results, then that selected search result may be launched. In the case of an executable file, that executable file is executed (i.e., run). In the case of a non-executable file, the non-executable file is opened in its associated executable file. In the case of an Internet site, the associated web browser is executed and the Internet site is browsed to. The user may select a particular search result in any way desired, for example by using a mouse and clicking on the search result, or by scrolling through and highlighting the search results using the keyboard arrows and selecting the highlighted search result using the enter key.

There are various acceptable ways to type a textual input that represents an executable file that should be run. For instance, the user may include a file extension, a parameter, and/or a file path, which would be interpreted in the same manner as if the textual input were entered into the convention Run dialog. As an example, to execute the msconfig.exe program that is stored in the file path c:\windows\system32, the user may type as the textual input any of the following: "msconfig", "msconfig.exe", "msconfig-p", or "c:\windows\system32\msconfig.exe".

File Path Browsing With Look-Ahead and Launch Features

Figure 7:
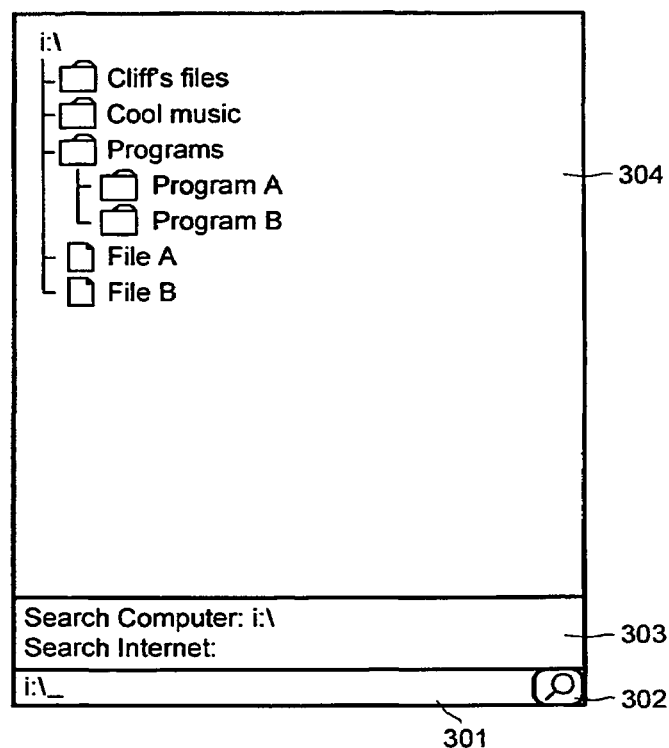

As previously mentioned, the user may also browse through file paths using the same text input box 301. Referring to FIGS. 2 and 7, the user may type, for example, "i:\" into text input box 301 (step 202). In response, the textual input is analyzed (step 203) and computer 100 determines whether the textual input represents at least a portion of an item name of a file path name. Here, a character ("\") that in this example is considered a special indicator character has been typed, meaning that computer 100 determines this textual input to represent at least a portion of a file path name, and so a file path browsing mode is entered. Thus, instead of step 205 being performed, step 206 is performed.

In step 206, computer 100 determines the file path that is most likely being represented by the textual input. This may be done in a variety of ways. For example, computer 100 may search for all file paths that begin with the textual input or that otherwise include the textual input. In the present example, the textual input "i: \" refers broadly to the highest level path on the i: drive. Note that, had the user simply entered "i" as the textual input, then computer 100 would respond as in FIG. 3. Thus, computer 100 is able to automatically make decisions as to what the user most likely intends and enter either the searching mode or the browsing mode, as appropriate.

In step 207, computer 100 displays in search results area 304 the determined file path including at least one item in the file path. In this example, there are three folders (Cliffs files, Cool music, and Programs" and two files (File A and File B) at the highest level of drive i:, and two folders (program A and Program B) at a second level down the hierarchy. Any number of hierarchical levels of the determined file path may be simultaneously displayed, as desired. By providing a real-time indication to the user of the folders and files in the file path, the user is essentially provided with a path lookahead feature. This is convenient way to browse through files and folders.

Referring again to FIG. 2, computer 100 may then wait for additional textual input or a user selection of one of the displayed items. For instance, is additional textual input of "c" is added to the existing textual input (such that the textual input is now "i:\c"), then the file path is again determined and updated as appropriate, and those items within the determine file path may further be filtered to only show those items within the file path that are consistent with the textual input. In this example, only those items within the i:\ file path that contain the letter "c" are displayed in search results area 304.

Figure 8:
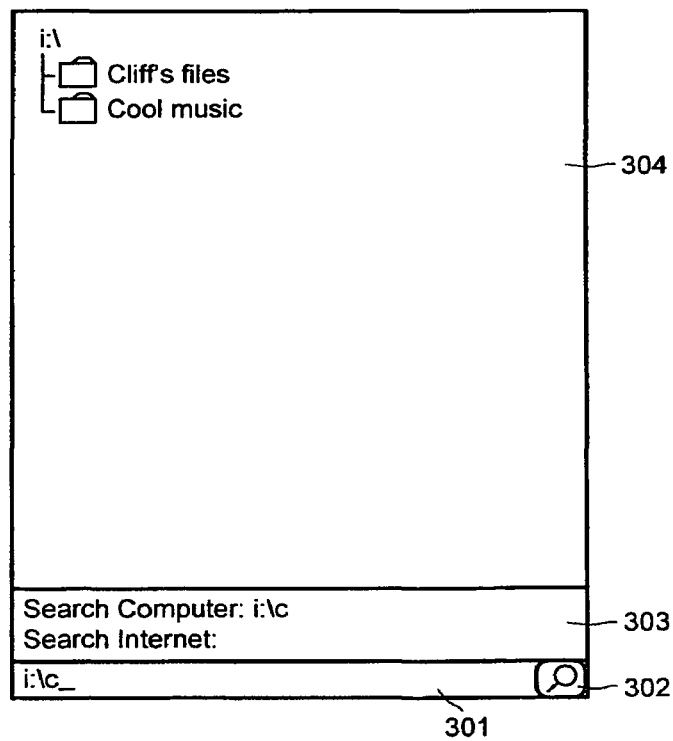

As with any other search results displayed in search results area 304, the user may select one of the search results in FIG. 7 or 8 and cause the selected search result to be launched in the same manner as previously described.

Conclusion

Thus, the user may now search, browse, and launch files, folders, Internet favorites, and other items using the same user interface. Search and browse modes may be automatically switched to depending upon the user's textual search criteria, thus making it more convenient than ever before for the user to perform all these functions. In addition, advanced items may be suppressed unless those items are fully described, which is likely to happen only on an intentional basis such as by an advanced user. This may help prevent accidental damage done to a system by a typical non-advanced user.

From the foregoing, it will be seen that this invention is one well adapted to attain all the ends and objects hereinabove set forth together with other advantages which are obvious and which are inherent to the structure.

Having thus described the invention, what is claimed is:

1. A computer-storage device storing computer-executable instructions for performing a method of filtering search results to hide advanced files, the method comprising:
   receiving, at a computing device, a textual input as a search criteria;
   determining that each of a plurality of files have a file name that partially matches the textual input, wherein the file name partially matches the textual input when the file name includes the textual input and has one or more additional characters;
   determining that a subset of the plurality of files are advanced files, wherein a file is an advanced file if the file has a metadata entry designating the file as advanced;
   displaying search results that include representations of files in the plurality of files that partially match the textual input while suppressing display of the advanced files that partially match the textual input, thereby preventing representations of advanced files from being displayed as part of the search results;
   receiving a modification to the textual input forming a modified input;
   determining that the modified input fully matches the advanced file because the modified input is a full file name of the advanced file; and
   displaying a representation of the advanced file.

2. The computer-storage medium of claim 1, wherein the modified input matches the full file name of the advanced file plus an extension on the file name.

3. The computer-storage medium of claim 1, wherein each of the plurality of files further includes a textual extension in addition to the file name.

4. The computer-storage medium of claim 1, wherein the steps further include:
   receiving a user selection of the representation of the advanced file; and
   responsive to receiving the user selection, executing or opening the advanced file represented.

5. The computer-storage medium of claim 1, wherein the textual input is a single character.

6. The computer-storage medium of claim 1, wherein the file name includes a file extension indicating a system file.

7. The computer-storage medium of claim 1, wherein the advanced file is executable.

8. A computer-storage device storing computer-executable instructions for performing steps, the steps comprising:
   receiving, at a computing device, a text string;
   generating a plurality of files having a name beginning with the text string,
   determining which of the plurality of files are advanced files, wherein a file is an advanced file if the file has one of a plurality of designated file extensions;
   displaying representations of files in the plurality of files while simultaneously suppressing display of representations of the advanced files within the plurality of files unless the text string exactly matches an entire name, including extension, of an advanced file, thereby preventing the display of the representations of the advanced files unless the text string exactly matches the name of the advanced file;
   receiving a modification to the textual input forming a modified input;
   determining that the modified input fully matches the advanced file because the modified input is a full file name of the advanced file; and
   displaying a representation of the advanced file.

9. The computer-storage medium of claim 8, wherein said exactly matching requires an entire file path for the advanced file.

10. The computer-storage medium of claim 8, wherein the extension indicates a system file.

11. A computer-storage device storing computer-executable instructions for performing steps, the steps comprising:
   receiving, at a computing device, a text string in a search input interface, wherein the text string is a beginning of a file path;
   determining that the text string represents at least a portion of the file path;
   displaying representations of a plurality of files in the file path while simultaneously suppressing display of representations of advanced files within the plurality of files unless the text string exactly matches an complete file path, wherein an advanced file has one of a plurality of designated file extensions;
   receiving a modification to the textual input forming a modified input;
   determining that the modified input fully matches the advanced file because the modified input is a complete file path for the advanced file; and
   displaying a representation of the advanced file.

12. The computer-storage medium of claim 11, wherein the designated file extensions indicate a system file.

13. The computer-storage medium of claim 11, wherein the steps further include displaying a text box for receiving a user input of the text string.

14. The computer-storage medium of claim 11, wherein the steps further include:
   receiving a user selection of one of the representations; and
   responsive to receiving the user selection, executing or opening the file represented by the one of the representations.

* * * * *